Jan. 13, 1931.   B. DARROW   1,788,862
WHEEL ASSEMBLY
Filed Feb. 2, 1928
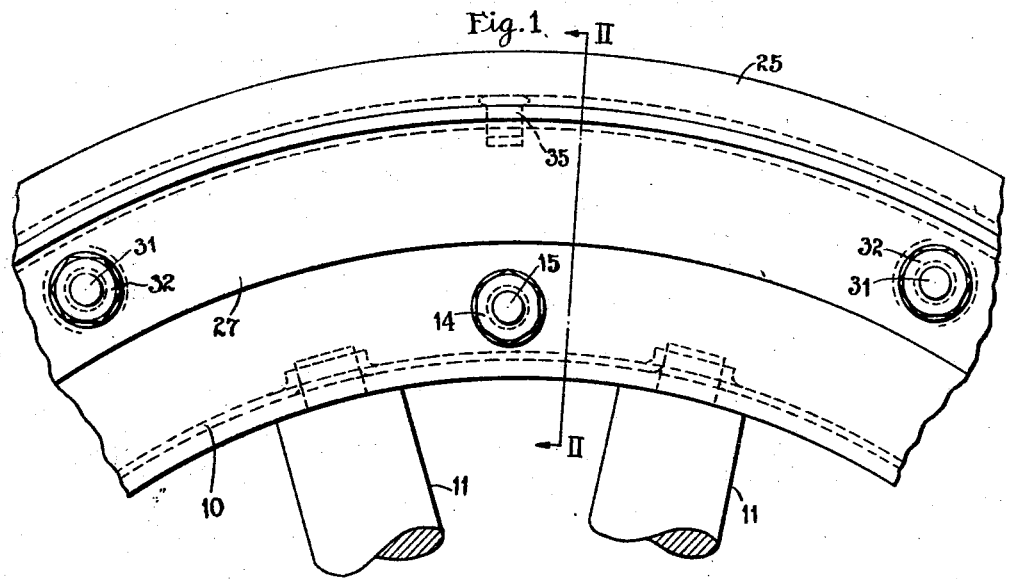
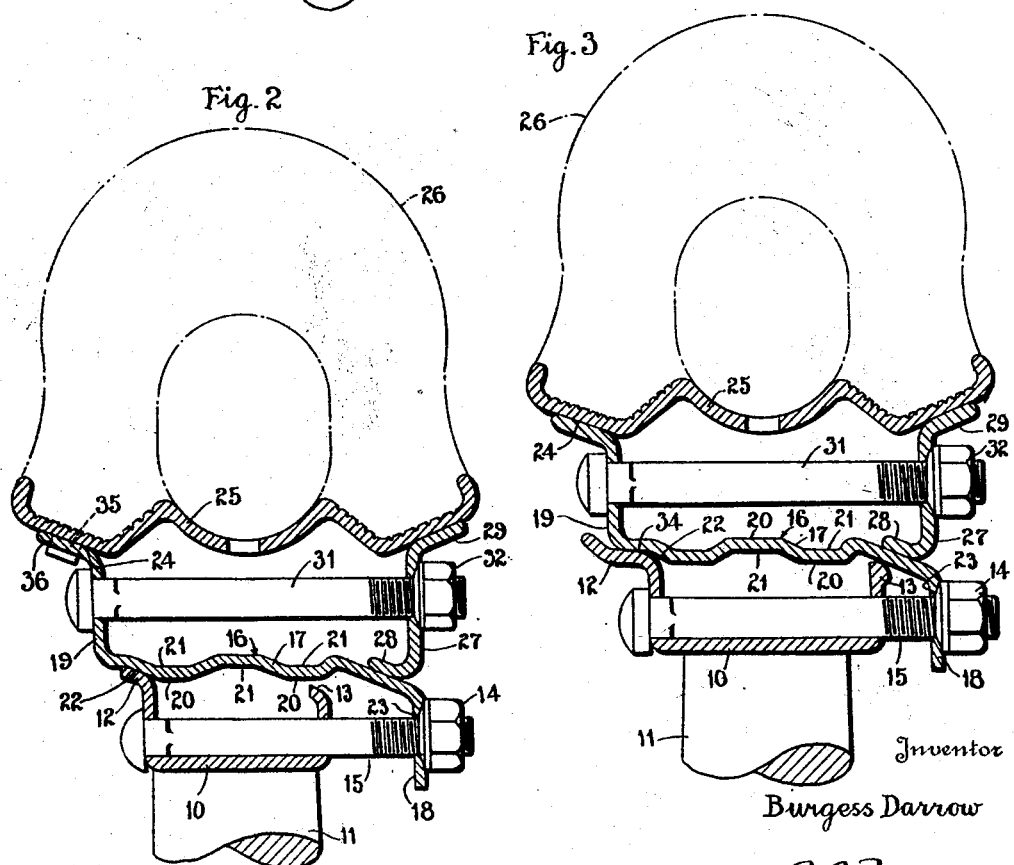
Inventor
Burgess Darrow
By
R. S. Ingram
Attorney Patented Jan. 13, 1931

1,788,862

UNITED STATES PATENT OFFICE

BURGESS DARROW, OF AKRON, OHIO, ASSIGNOR TO THE GOODYEAR TIRE & RUBBER COMPANY, OF AKRON, OHIO, A CORPORATION OF OHIO

WHEEL ASSEMBLY

Application filed February 2, 1928. Serial No. 251,368.

This invention relates to wheel assemblies and it has particular relation to wheel assemblies that facilitates the substitution of a cushion tire for a pneumatic tire and rim, without alteration of the diameter of the assembly.

Since the advent of balloon tires, smaller wheels are necessarily employed on all standard makes of automobiles. It is no longer practicable, therefore, to substitute solid or cushion tires of the same size as the pneumatic tires to be replaced by reason of the large amount of rubber required to produce such tires. It is desirable to utilize cushion tires of standard sizes to replace the pneumatic tires and their carrying rims in order that the number of sizes of tires which a dealer must carry be maintained at a minimum. It is also desirable at times to substitute a larger standard tire for a tire in use without changing the wheel upon which it is mounted.

The primary object of this invention is to provide an adapter which may be demountably secured upon standard wheels of various forms and is capable of demountably supporting either standard cushion tires or standard rims carrying pneumatic tires.

A further object of the invention is to provide an adapter formed with a plurality of seating surfaces, whereby it may be demountably secured, selectively, upon different types of standard felloes.

A still further object of the invention is the provision of a wheel assembly including a felloe normally adapted to support demountably a cushion tire or a tire carrying rim of a specified internal diameter, having a cushion tire or a tire carrying rim of greater internal diameter demountably secured thereon.

For a better understanding of the invention, reference may now be had to the accompanying drawing forming a part of the disclosure, wherein:

Figure 1 is a fragmentary side-elevational view of a portion of a wheel assembly embodying the features of the invention;

Figure 2 is a transverse sectional view taken substantially along the line II—II of Figure 1; and Figure 3 is a similar view illustrating the invention as applied to a different form of wheel.

The wheel assembly constituting the subject matter of this application was devised primarily to provide means whereby a single standard size of cushion tire might be applied selectively to various standard felloes commonly employed in automobiles; for example, of the Ford or of the Chevrolet type, to replace the pneumatic tires commonly used thereon, without altering the exterior diameter of the wheel assembly.

Figures 1 and 2 of the drawing illustrate the invention as applied to a standard Chevrolet wheel. This type of wheel comprises a channel-shaped felloe 10 connected to a hub (not shown) by means of spokes 11. One side of the felloe is laterally flared, as indicated at 12, to provide a rim seating surface and the other side 13 is adapted to be engaged by conventional clamping lugs (not shown), which are forced into engagement with the rim by means of nuts 14 threaded on bolts 15 traversing the felloe at spaced points.

An adapter 16, including an annular central portion or ring 17, an integral apertured annular flange 18 extending radially inwardly from the central portion 17, and an annular flange 19 which extends radially outwardly from the portion 17, is mounted upon the felloe. The central portion 17 of the adapter is provided with annularly extending ridges 20 and recesses 21 to strengthen it and also to provide a tapered seating surface 22 for engagement with the flared portion 12 of the felloe.

The bolts 15 which pass through the felloe 10 and through apertures 23 in the flange 18, serve to support one side of the adapter and the nuts 14 threaded on the bolts serve to retain the seating surface 22 in contact with the flared portion 12 of the felloe. The outer portion of the flange 19 is flared to provide an annular seat 24 for engagement with a band 25 of a cushion tire 26 or with a rim (not shown) for supporting a pneumatic tire.

A ring 27 formed with substantially oppositely extending flanges 28 and 29 for engagement respectively with the portion 17 and with the band 25, demountably secures the tire carrying band 25 in operative position upon the wheel and is itself maintained in position by bolts 31 and nuts 32 threaded thereon.

Figure 3 of the drawings illustrates a cushion tire 26 demountably positioned upon a standard Ford wheel by means of the same form of adapter 16. This embodiment of the invention differs from that just described only with regard to the engagement of the element 17 with the flared portion 12 of the felloe 10. It will be observed that, due to the difference in the construction of the felloe itself, a supporting surface 34 instead of the supporting surface 22 of the element 17 engages the flared portion 12 of the wheel.

One or more conventional driving lugs 35 are, of course, provided upon the band 25 and engage within slots 36 provided therefor in the adapter 16 to prevent relative circumferential movement of the band and adapter.

From the foregoing description it is apparent that the adapter 16 facilitates the substitution of a comparatively large tire for a smaller one upon the same wheel. For example, a standard cushion tire or rim designed to seat upon a twenty-three inch wheel may be secured demountably upon a twenty-one inch wheel by means of this adapter. The exterior diameter of the resulting assembly will be substantially the same as the external diameter of the twenty-one inch wheel having a standard balloon tire mounted thereon.

It is to be understood that the expression "tire-carrying band" as employed herein defines either a rim for carrying a pneumatic tire or a band upon which a solid or cushion tread is mounted.

Although I have illustrated only two forms which the invention may assume and have described in detail only preferred applications thereof, it will be apparent to those skilled in the art that it is not so limited, but that various minor modifications may be made therein without departing from the spirit of the invention or from the scope of the appended claims.

What I claim is:

1. An adapter comprising a ring formed with means for seating it upon different standard forms of felloes, a flange extending radially inwardly from the ring for engagement by securing means carried by such felloes to secure the ring demountably thereon, a flange extending radially outwardly from the ring and formed with a flared seating surface, a clamping ring seated upon the ring and formed with a seating surface, and means for coaction with the rings to secure a tire carrying band demountably upon said seating surfaces.

2. An adapter comprising a ring formed to seat upon different standard forms of felloes, an integral flange extending radially inwardly from the ring for attachment to a felloe, an integral flange extending radially outwardly from the ring and formed with a seating surface, a clamping ring seated upon the ring and formed with an outer seating surface, bolts traversing the rings, and nuts on the bolts for demountably securing a tire band upon said seating surfaces.

In witness whereof, I have hereunto signed my name.

Signed at Akron, in the county of Summit and State of Ohio, U. S. A., this 1st day of February, 1928.

BURGESS DARROW.